(12) United States Patent
Seo et al.

(10) Patent No.: US 7,831,131 B2
(45) Date of Patent: *Nov. 9, 2010

(54) METHOD OF CREATING PLAYBACK CONTROL FILE FOR RECORDING MEDIUM AND METHOD AND APPARATUS FOR REPRODUCING DATA USING THE PLAYLIST CONTROL FILE

(75) Inventors: Kang Soo Seo, Anyang-si (KR); Byung Jin Kim, Seongnam-si (KR); Jea Yong Yoo, Seoul (KR)

(73) Assignee: LG Electronics, Inc., Seoul (KR)

( * ) Notice: Subject to any disclaimer, the term of this patent is extended or adjusted under 35 U.S.C. 154(b) by 1123 days.

This patent is subject to a terminal disclaimer.

(21) Appl. No.: 10/577,656

(22) PCT Filed: Nov. 24, 2004

(86) PCT No.: PCT/KR2004/003036

§ 371 (c)(1), (2), (4) Date: May 1, 2006

(87) PCT Pub. No.: WO2005/050529

PCT Pub. Date: Jun. 2, 2005

(65) Prior Publication Data

US 2007/0086726 A1     Apr. 19, 2007

(30) Foreign Application Priority Data

Nov. 24, 2003  (KR) ............... 10-2003-0083689

(51) Int. Cl.
*H04N 7/00* (2006.01)
*H04N 5/00* (2006.01)
(52) U.S. Cl. ......................... 386/95; 386/125
(58) Field of Classification Search .............. 386/83, 386/95, 125, 126
See application file for complete search history.

(56) References Cited

U.S. PATENT DOCUMENTS 6,078,727 A * 6/2000 Saeki et al. ............... 386/125

(Continued)

FOREIGN PATENT DOCUMENTS

JP     2002-247526     8/2002

(Continued)

OTHER PUBLICATIONS

Office Action issued Nov. 26, 2007 by the European Patent Office in counterpart European Application No. 04 800 121.8-2223.

(Continued)

*Primary Examiner*—Thai Tran
*Assistant Examiner*—Gelek Topgyal
(74) *Attorney, Agent, or Firm*—Harness, Dickey & Pierce, P.L.C.

(57) ABSTRACT

A method of creating a playback control file for a recording medium and method and apparatus for reproducing data using the playback control file are disclosed. The method of creating a playback control file for a recording medium includes reading a virtual PlayList identifying a download list from the recording medium, the download list designating at least one additional clip downloadable from an external source, downloading the at least one additional clip from the external source, and creating a new PlayList based on the virtual PlayList, the new PlayList including a new PlayItem designating the at least one additional clip designated by the download list.

16 Claims, 19 Drawing Sheets

U.S. PATENT DOCUMENTS

| | | | |
|---|---|---|---|
| 6,263,150 B1* | 7/2001 | Okada et al. | 386/52 |
| 6,760,918 B2* | 7/2004 | Rodriguez et al. | 725/134 |
| 6,922,521 B2* | 7/2005 | Okada et al. | 386/83 |
| 6,931,198 B1* | 8/2005 | Hamada et al. | 386/46 |
| 7,046,805 B2* | 5/2006 | Fitzhardinge et al. | 380/212 |
| 7,487,128 B2* | 2/2009 | Spagna et al. | 705/51 |
| 7,639,923 B2* | 12/2009 | Ikeda et al. | 386/95 |
| 2001/0042249 A1* | 11/2001 | Knepper et al. | 725/42 |
| 2001/0053944 A1 | 12/2001 | Marks et al. | |
| 2002/0054116 A1 | 5/2002 | Pavley et al. | |
| 2002/0145702 A1* | 10/2002 | Kato et al. | 352/1 |
| 2003/0009452 A1 | 1/2003 | O'Rourke et al. | |
| 2003/0133375 A1 | 7/2003 | Ando et al. | |
| 2003/0161615 A1* | 8/2003 | Tsumagari et al. | 386/95 |
| 2003/0215209 A1 | 11/2003 | Kawaguchi | |
| 2003/0217170 A1* | 11/2003 | Nelson et al. | 709/231 |
| 2004/0096186 A1* | 5/2004 | Tsumagari et al. | 386/46 |
| 2004/0120695 A1* | 6/2004 | Tsumagari et al. | 386/109 |
| 2004/0126095 A1* | 7/2004 | Tsumagari et al. | 386/95 |
| 2004/0128198 A1* | 7/2004 | Register et al. | 705/14 |
| 2005/0174666 A1* | 8/2005 | Frimout et al. | 360/27 |

FOREIGN PATENT DOCUMENTS

| | | |
|---|---|---|
| JP | 2004-120099 | 4/2004 |
| KR | 2002057441 A | 7/2002 |
| RU | 2 229 174 | 5/2004 |

OTHER PUBLICATIONS

Office Action issued Jul. 21, 2009 by the Russian Patent Office in counterpart Russian Patent Application No. 2006122547/28 (with English language translation).

Office Action issued Feb. 26, 2010 by the Japanese Patent Office in counterpart Japanese Patent Application No. 2006-541034 (with English language translation).

* cited by examiner

```
PID_Table () {
    length
    number_of_PID_entries
    for (k=0: k< number_of_PID_entries: k++) {
        ref_to_stream_PID(k)
        attributes
        sub_PlayItem_num
    }
}
```

US 7,831,131 B2

METHOD OF CREATING PLAYBACK CONTROL FILE FOR RECORDING MEDIUM AND METHOD AND APPARATUS FOR REPRODUCING DATA USING THE PLAYLIST CONTROL FILE

TECHNICAL FIELD

The present invention relates to a recording medium, and more particularly, to a method of creating a playback control file for a recording medium and method and apparatus for reproducing data using the playback control file. Although the present invention is suitable for a wide scope of applications, it is particularly suitable for creating a playback control file that enables data being recorded on the recording medium and data existing within an external source to be used in combination, and for playing-back the playback control file.

BACKGROUND ART

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. The blu-ray disc (BD), which is known to be the next generation recording medium technology, is also considered to be a next generation optical recording solution that is capable of having data significantly surpassing the conventional DVD. And, recently, optical recording and/or reproducing apparatuses for recording and/or reproducing the blu-ray disc (BD) has been under development.

Most particularly, in the above-described optical recording and/or reproducing apparatus, the basic function(s) of recording and/or reproducing the blu-ray disc (BD), as well as additional functions taking into account a combined usage with related peripheral digital apparatuses are/is being considered. Thus, generally, the optical recording and/or reproducing apparatus must be provided with functions of either receiving external input signals and displaying the received signals, or applying external input signals with a built-in blu-ray disc (BD) playback signal for reproduction.

However, since preferable playback (or reproducing) methods for reproducing a binding of the external input signal and the built-in blu-ray disc (BD) playback signal are not yet known and familiarized, there are many restrictions in the full-scale development of a blu-ray disc (BD)-based optical recording and/or reproducing apparatus. And, such restrictions cause problems in the field of reproducing the external input signal and the built-in blu-ray disc (BD) playback signal as one single reproducing unit.

DISCLOSURE OF INVENTION

An object of the present invention devised to solve the problem lies on providing a method and apparatus for reproducing data using the playback control file that are suitable for a recording medium, such as a blu-ray disc (BD).

Another object of the present invention devised to solve the problem lies on providing a method for control and playing-back a new PlayList file of a high density optical disc, wherein a signal recorded on a blu-ray disc (BD) and a signal downloadable from an external source are bound together for reproduction (or playback), as standardized information.

The object of the present invention can be achieved by providing a method of creating a playback control file for a recording medium, which includes reading a virtual PlayList identifying a download list from the recording medium, the download list designating at least one additional clip downloadable from an external source, downloading the at least one additional clip from the external source, and creating a new PlayList based on the virtual PlayList, the new PlayList including a new PlayItem designating the at least one additional clip designated by the download list. Herein, the virtual PlayList may include an original PlayItem designating at least one original clip recorded on the recording medium. And, the new PlayItem may further designate the at least one original clip designated by the original PlayItem.

In another aspect of the present invention, provided herein is a method of reproducing data recorded on a recording medium, which includes reading a virtual PlayList identifying a download list from the recording medium, the download list designating at least one additional clip downloadable from an external source, downloading the at least one additional clip from the external source, creating a new PlayList based on the virtual PlayList, the new PlayList including a new PlayItem designating the at least one additional clip designated by the download list, and playing-back selected one of a normal PlayList and the new PlayList, wherein the normal PlayList has an original PlayItem designating at least one original clip recorded on the recording medium.

In another aspect of the present invention, provided herein is an apparatus for reproducing data recorded on a recording medium, which includes a data storage configured to store at least one additional clip downloaded from an external source, and a controller configured to read a virtual PlayList identifying a download list from the recording medium, the download list designating the at least one additional clip, wherein the controller creates a new PlayList based on the virtual PlayList, the PlayList including a new PlayItem designating at least one additional clip designated by the download list.

In a further aspect of the present invention, provided herein is a recording medium, which includes a first data area for storing original clips, and a second data area for storing a normal PlayList and a virtual PlayList, the normal PlayList identifying an original PlayItem designating at least one of the original clips, the virtual PlayList including a download list which designates at least one additional clip downloadable from an external source.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, an optical disc and, more specifically, a "blu-ray disc (BD)" will be given as an example of the recording medium proposed herein. However, it will be apparent that the spirit or scope of the present invention may be equally applied to other types of recording medium.

Figure 1:
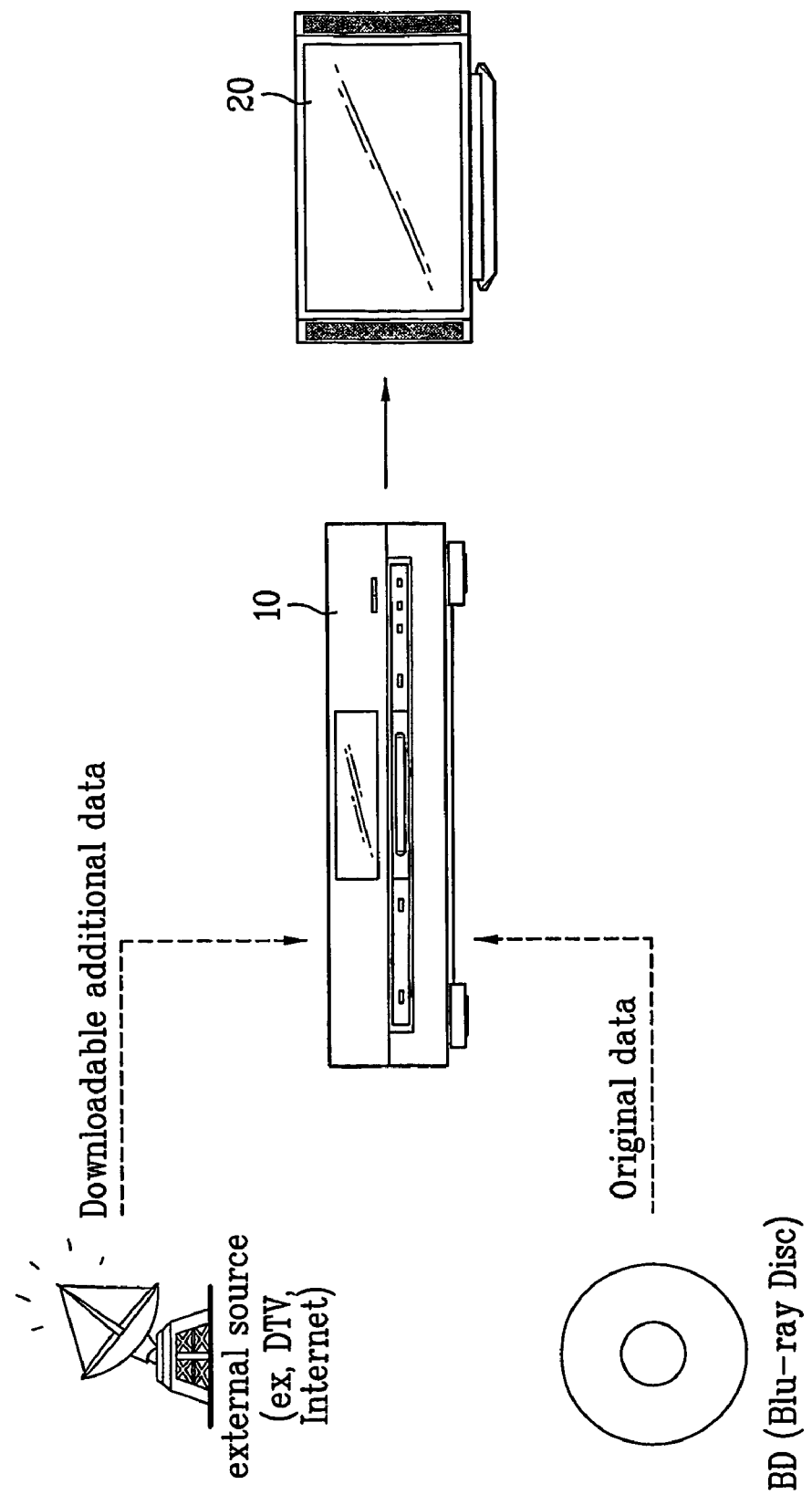
FIG. 1 illustrates a general view of the present invention.

FIG. 1 illustrates a general view of the present invention, which shows an example of a combined usage between an optical recording and/or reproducing apparatus 10 and peripheral apparatuses. The optical recording and/or reproducing apparatus 10 according to the present invention is an apparatus for recording and/or reproducing optical discs of various standards (or sizes). The optical recording and/or reproducing apparatus 10 may also be designed to record and/or reproduce an optical disc of a specific standard (e.g., a blu-ray disc (BD)). Alternatively, the apparatus may also be designed to only have a reproducing function and no recording function. However, considering the completion of the blu-ray disc (BD) standard and its connection with the peripheral apparatuses, either a BD-Player reproducing the blu-ray disc (BD) or a BD-Recorder recording and/or reproducing the blu-ray disc (BD) will be used as an example in the description of the present invention.

Apart from the function of recording and/or reproducing the disc, the optical recording and/or reproducing apparatus is also provided with a function of receiving an external input signal, processing the received signal, and transmitting the processed signal to a user through another external display 20. In this case, there are no limitations in the external signals that can be inputted, however, digital television (DTV) broadcast programs and the Internet are the most typical types of external signals. Most particularly, since the Internet is presently a medium that can be easily accessed by the public, users can make use of specific data provided on the Internet by downloading such data through the optical recording and/or reproducing apparatus.

Moreover, in the present invention, when original data is recorded on the optical disc (BD), which is loaded in the optical recording and/or reproducing apparatus 10, and additional data related to the original data is downloadable from an external source, the original data and the additional data are bound together and reproduced. More specifically, for example, when a video stream and an audio stream (both in Korean) for a film dubbed in Korean are recorded as the original data on the optical disc, and when an audio stream (in English) for the original film in English exists on the Internet as the additional data, a user may wish to download the audio stream (in English), which is the additional data existing on the Internet, and either reproduce the downloaded audio stream (in English) along with the video stream within the original data or individually reproduce the downloaded audio stream (in English). In order to meet with the demands of the user, a definition of the file structure for reproducing the original data and the additional data is necessary, and a systematic method for controlling and reproducing such data as desired by the user is also required.

As aforementioned, the signal recorded within the disc is referred to as the original data and the signal existing in the external source is referred to as the additional data, for simplicity. However, such terms may vary depending upon the method of acquiring the data and are not limited to any specific type of data. Therefore, the additional data generally includes audio data, presentation graphic data, subtitle data, interactive graphic data, and so on. And, without being limited to the above-mentioned examples, it is possible to propose a binding of the original data and the additional data, wherein an audio stream (in English) is the original data and a video stream is the additional data.

In order to meet with the demands of the user, a file structure for reproducing the original data and the additional data must be included in the optical disc, which will be described in detail with reference to FIGS. 2 to 4. Herein, FIGS. 2 and 4 illustrate a file structure and a data recording structure being used in the optical disc according to the present invention, respectively.

Figure 2:
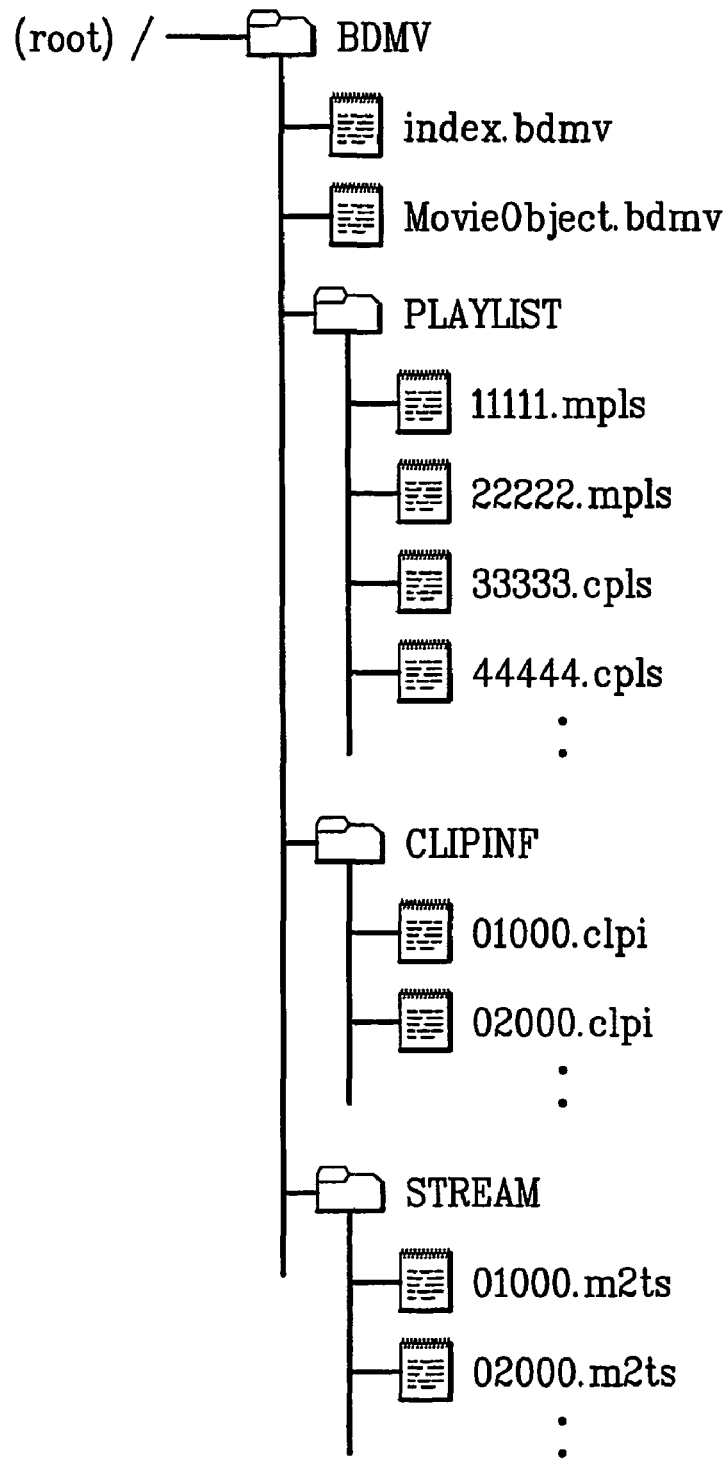
FIG. 2 illustrates a file structure being recorded on an optical disc, the optical disc being a recording medium, according to the present invention.
Figure 3A:
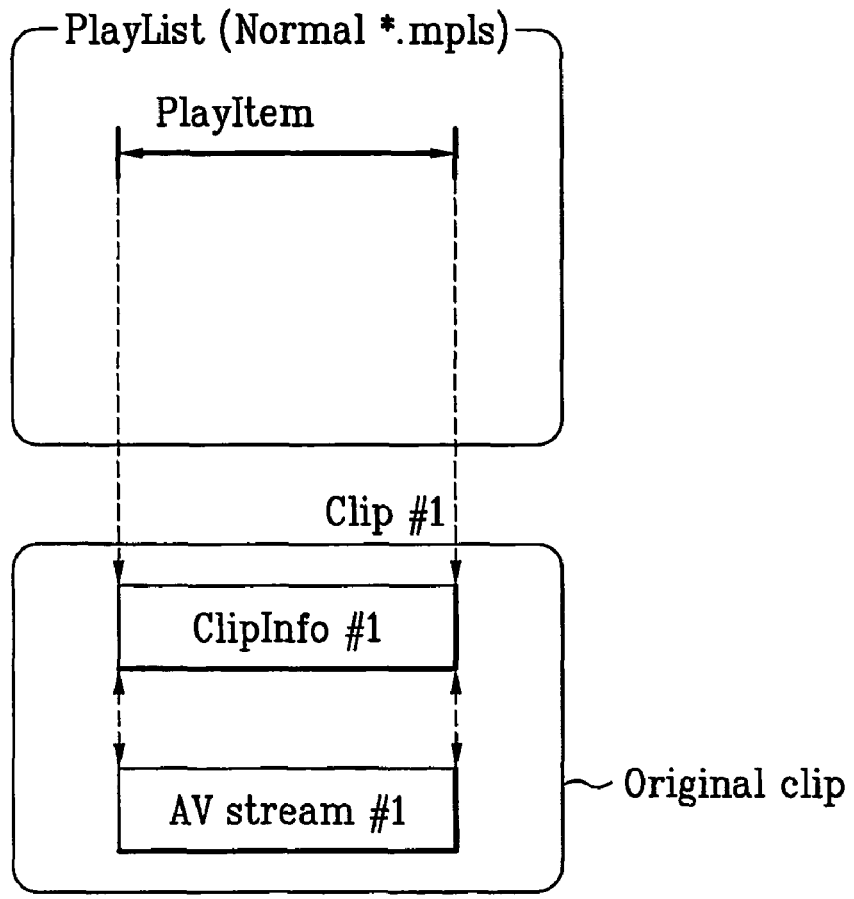
FIGS. 3A to 3D illustrate structures of a normal PlayList and a virtual PlayList, the PlayLists being the playback control files.

Referring to FIG. 2, which illustrates a file structure for controlling information recorded within the disc, at least one BD directory (BDMV) is included in a root directory (root). Each BD directory includes an "index.bdmv" and a "MovieObject.bdmv", which represent general files that are used when interacting with one or more users. For example, the index file contains data representing an index table which includes diverse information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF). The stream directory includes audio/video (AV) stream (hereinafter referred to as "AV stream") files. More specifically, the AV streams (01000.m2ts, 02000.m2ts) may generally be in the form of MPEG2 transport packets and be named as "*.m2ts". Further, the clip information directory (CLIPINF) includes clip information files (01000.clpi, 02000.clpi) being in one-to-one correspondence with the AV stream files (clip files) included in the stream directory. A clip information file (*.clpi) includes property information and timing information of a corresponding AV stream (clip file), wherein the timing information includes mapping information that maps presentation time stamp (PTS) with source packet number (SPN) using entry point map.

In the BD standard, each pair of an AV stream (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip. Hereinafter, the clip corresponding to the original data, which is recorded within the disc, will be referred to as an "original clip", and the clip corresponding to the additional data, which is downloadable from an external source (i.e., outside of the disc), will be referred to as an "additional clip".

Referring back to FIG. 2, the playlist directory (PLAYLIST) includes one or more PlayList files (*.mpls, *.cpls), wherein each PlayList file (*.mpls, *.cpls) includes at least one PlayItem which designates playing interval for a specific original clip. More specifically, a PlayItem includes information designating beginning and ending times (In-Time and Out-Time) for reproduction of a specific original clip, which may be designated by clip_formation_File_name within the PlayItem. Accordingly, a PlayList file (*.mpls, *.cpls) represents a basic playback control file for playing-back a desired clip from a binding of one or more PlayItems. Therefore, by providing a PlayItem appropriate for a corresponding playback purpose within the PlayList file (*.mpls), special playback functions, such as trickplay, skipplay, slideshow, and so on, can also be executed.

Accordingly, the above-described playback control file within the disc refers to the PlayList file (*.mpls) and the clip information file (*.clpi). However, the clip information file (*.clpi), along with the stream file (*.m2ts), is provided either to the original clip or to the additional clip. Accordingly, in order to bind together and playback the original clip and the additional clip as one single playback unit, an independent PlayList file (*.mpls) is required. Hereinafter, the playback control file will be described with reference to the PlayList file (*.mpls) as the example.

More specifically, depending upon the reproduceability of the original data and the additional data, the PlayList can be categorized into two (2) different types (i.e., a normal PlayList and a virtual PlayList), which will be described in detail with reference to FIGS. 3A to 3D. FIG. 3A illustrates a PlayList for reproducing the original data only. In other words, the PlayList shown in FIG. 3A is a general reproduction control file including a PlayItem designating an original clip recorded within the optical disc. Hereinafter, the PlayList shown in FIG. 3A will be referred to as a "normal PlayList" having a file extension name of "*.mpls".

Figure 3B:
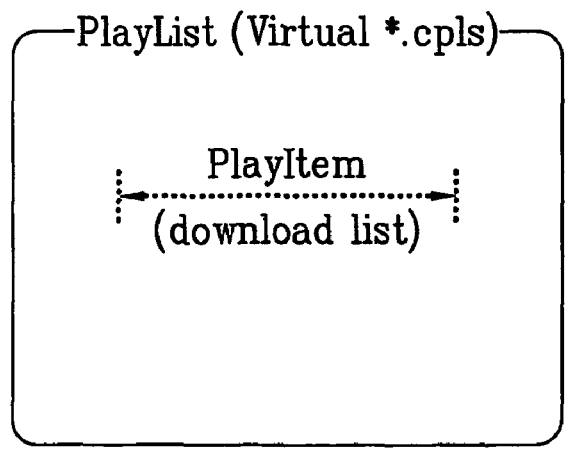
Figure 3C:
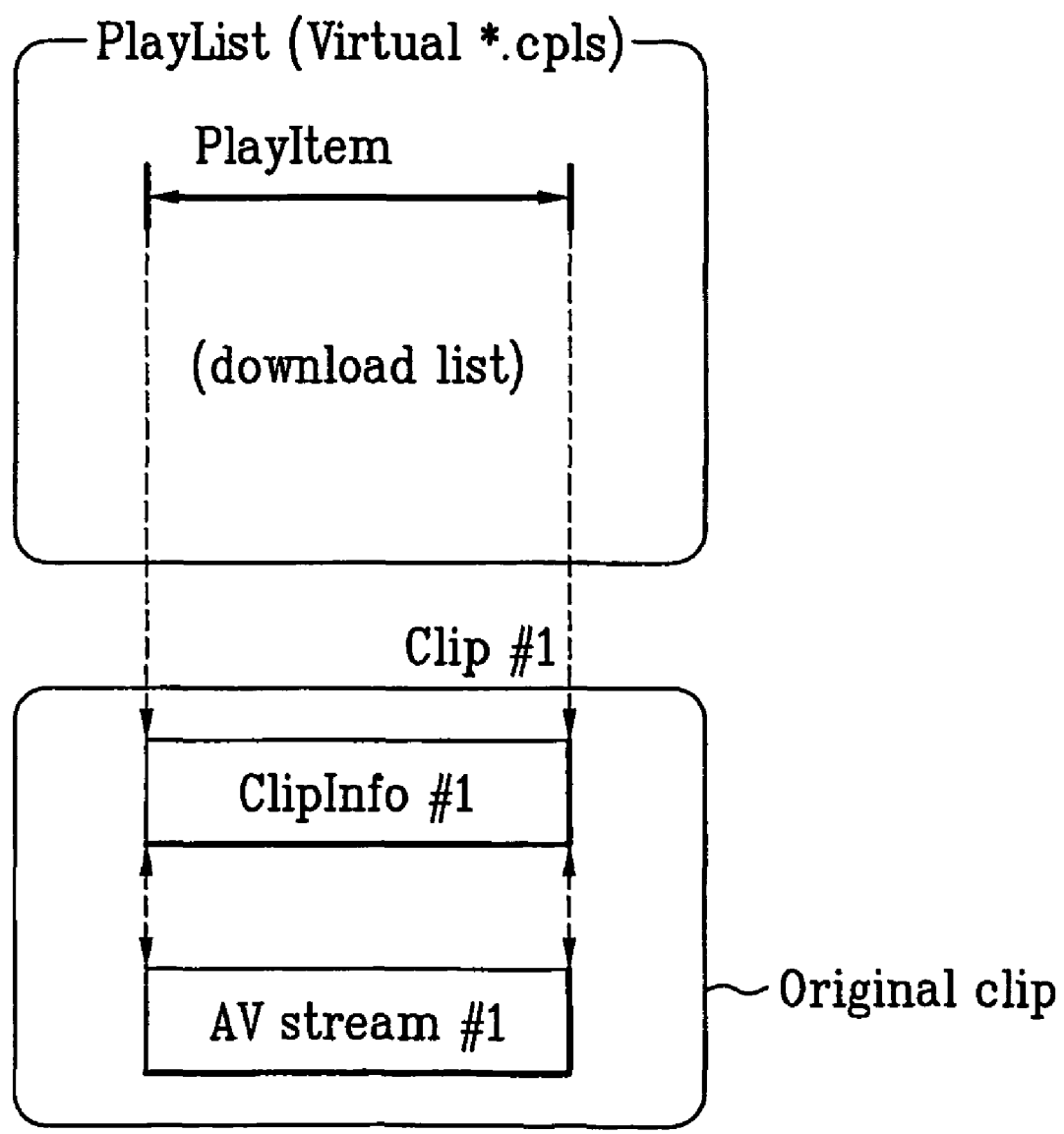
Figure 3D:
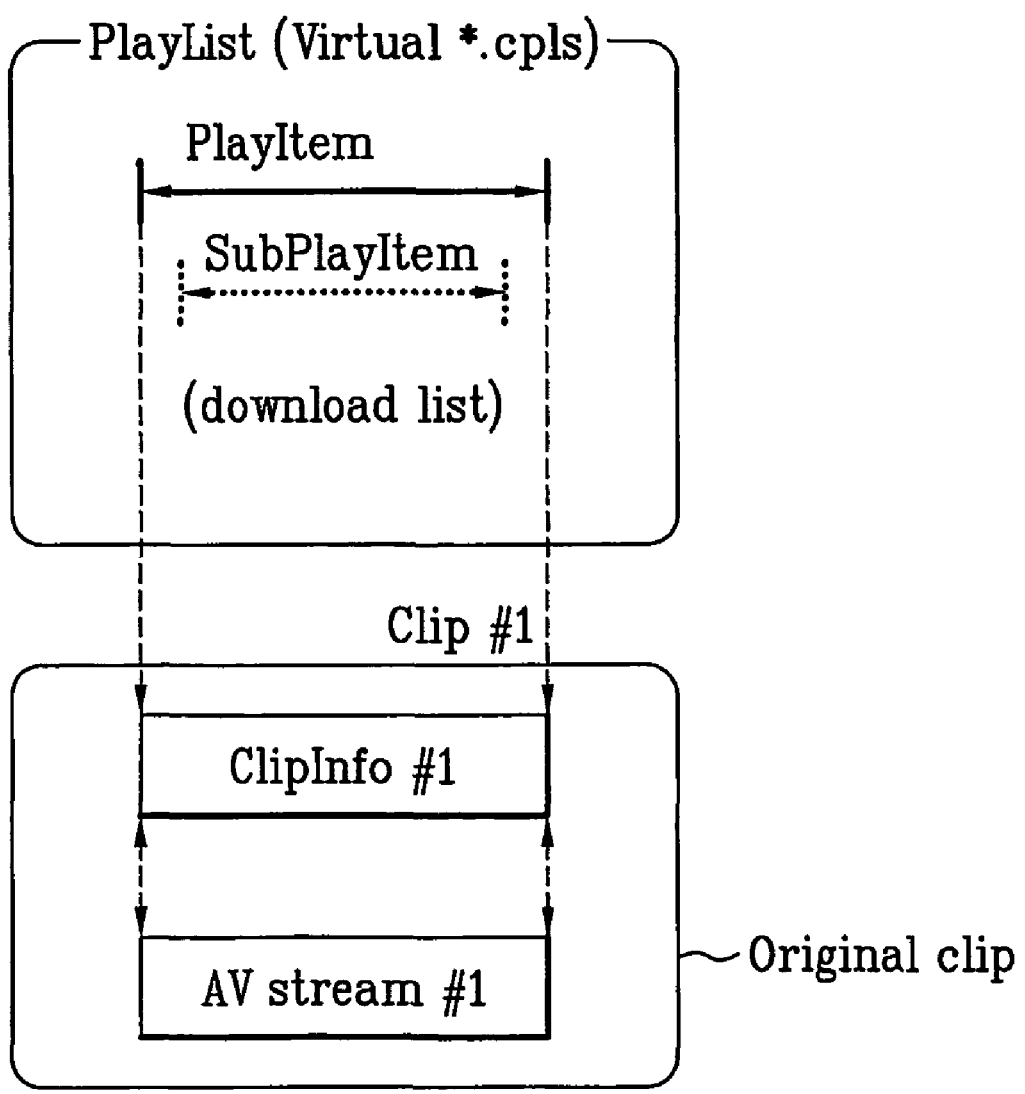
Figure 4:
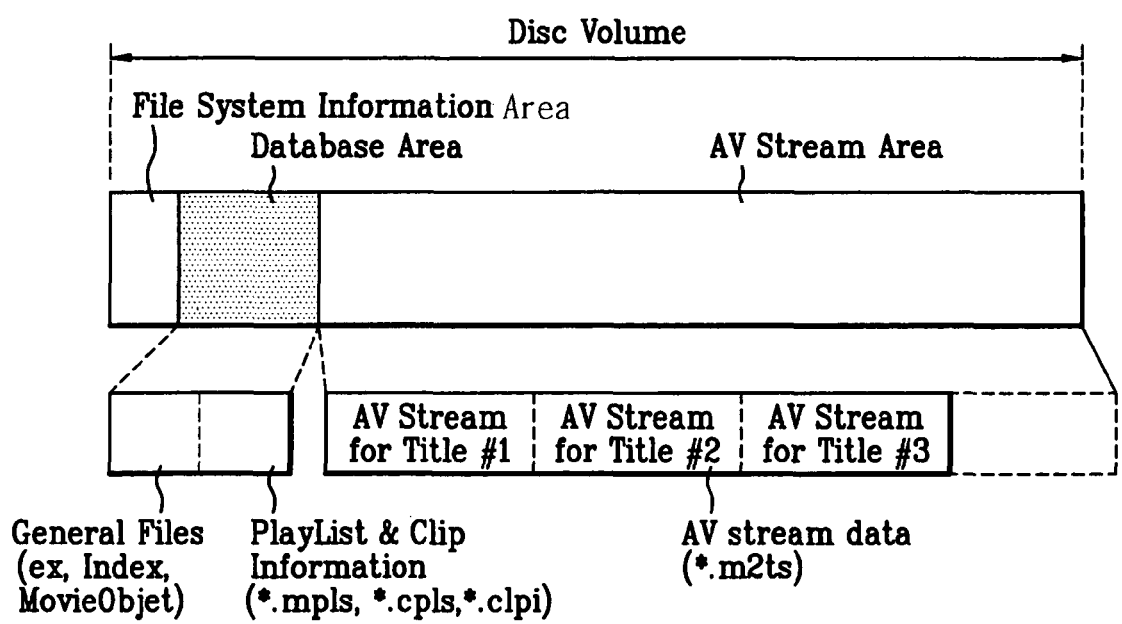
FIG. 4 illustrates a data recording structure being recorded on the optical disc, the optical disc being the recording medium, according to the present invention.

FIGS. 3B to 3D illustrate a PlayList that can reproduce additional data downloadable from an external source. In order to differentiate this type of PlayList from the PlayList for reproducing the original data only (i.e., the normal PlayList), the PlayList shown in FIGS. 3B to 3D will be referred to as a "virtual PlayList" having a file extension name of "*.cpls". More specifically, FIG. 3B illustrates a virtual PlayList for reproducing the additional data only. The virtual PlayList shown in FIG. 3B includes a PlayItem, however, the clip corresponding to this PlayItem is the additional data, which are downloadable from the external source, instead of being recorded on the optical disc. Therefore, the virtual PlayList should be provided with the corresponding additional data (e.g., downloaded from the Internet) in order to act as a complete PlayList. Accordingly, a "download list" designating the additional data that needs to be downloaded should be included in the virtual PlayList.

FIG. 3C illustrates an example of a virtual PlayList that can reproduce both the original data and the additional data. More specifically, a PlayItem is included in the virtual PlayList, and the PlayItem designates an original clip (Clip #1) to be reproduced. Herein, the additional data corresponding to the original data can be downloaded and used in combination. And, as described in FIG. 3B, the virtual PlayList shown in FIG. 3C also includes a "download list" for designating the additional data that needs to be downloaded.

FIG. 3D illustrates another example of a virtual PlayList that can reproduce both the original data and the additional data. More specifically, a PlayItem is included in the virtual PlayList, and the PlayItem designates an original clip (Clip #1) to be reproduced. Herein, a SubPlayItem is separately included in the virtual PlayList so as to allow the additional data corresponding to the original data to be downloaded and used in combination. In other words, the PlayItem controls reproduction of the original data, and the SubPlayItem controls reproduction of the additional data that is to be downloaded. Also, as described in FIGS. 3B and 3C, the virtual PlayList shown in FIG. 3D includes a "download list" for designating the additional data that needs to be downloaded.

More specifically, the example of the virtual PlayList shown in FIG. 3B is used for reproducing the additional data only. And, the examples of the virtual PlayList shown in FIGS. 3C and 3D are generally used for reproducing the original clip (Clip #1). However, when specific demands are made from the user or the system, an additional clip corresponding to the original data may be downloaded and used in combination. Furthermore, although the term "virtual PlayList" and the file extension "*.cpls" have been identically used in each of the examples shown in FIGS. 3B to 3D, and since each of the examples is used differently, the corresponding PlayList and file extension may also be named differently for each of the above described examples.

Additionally, a set of information designating the additional data that is to be downloaded from the external source and used (mentioned above as the "download list") is included in all types of virtual PlayLists (shown in FIG. 3B, FIG. 3C, and FIG. 3D). In the description of the present invention, examples of the virtual PlayLists each having a download list are proposed. However, a download list used for the entire optical disc may be included in a separate file. More specifically, a download list for a specific virtual PlayList may be included in the virtual PlayList, or the download list may be exist as a separate file. Further, the download list may be formed either by using the same file name as the additional data that is to be downloaded, or by using uniform resource locator (URL) information of the additional data located on the Internet. The advantage of the download list being formed by using the file name is that the additional data having the same file name can be easily downloaded from any location. Alternatively, forming the downloaded file by using the URL information is more advantageous in that the additional data can only be downloaded from the specific URL, thereby providing more reliable additional data.

FIG. 4 illustrates a data recording structure being recorded on the optical disc, the optical disc being the recording medium, according to the present invention. Starting from the inner circumference (or center) of the disc, the disc volume includes a file system information area occupying the inmost portion of the disc volume, an AV stream area occupying the outmost portion of the disc volume, and a database area occupied between the file system information area and the stream data area. In the file system information area, file system information for controlling the entire data files recorded on the disc is recorded. Examples of the file system information are file names, file types, and attributes of all the data files shown in FIG. 2. And, original data such as audio/video/graphic data are recorded in the AV stream area. The general files, PlayList files, and clip information files are recorded in the database area of the disc volume. Most particularly, as described above, the data recorded in the AV stream area within the disc is referred to as the original data. Therefore, by using the information within the database area, a user is able to select an AV stream, which the user desires to reproduce, and decide and use the appropriate reproducing method of the selected AV stream.

In addition, an independent PlayList including the additional data downloaded by using the virtual PlayList and the corresponding control information is created in an external source. In order to differentiate from the virtual PlayList, which is recorded on the optical disc, this independent PlayList will be referred to as a "new PlayList". Therefore, the virtual PlayList and the new PlayList are PlayLists for substantially reproducing the same data. More specifically, the virtual PlayList refers to a PlayList initially recorded on the optical disc, and the new PlayList refers to a PlayList which is newly created in an external source for controlling the data being reproduced by using the virtual PlayList. In some cases, the virtual PlayList may be used directly without having to create a new PlayList. Examples of creating the new PlayList are basically proposed in the embodiments of the present invention, however, the case of directly using the virtual PlayList will also be described whenever needed. Examples of a virtual PlayList and a new PlayList, as the playback control file for reproducing the original data and the additional data in combination, or for independently reproducing the additional data, will now be described in detail.

Figure 5A:
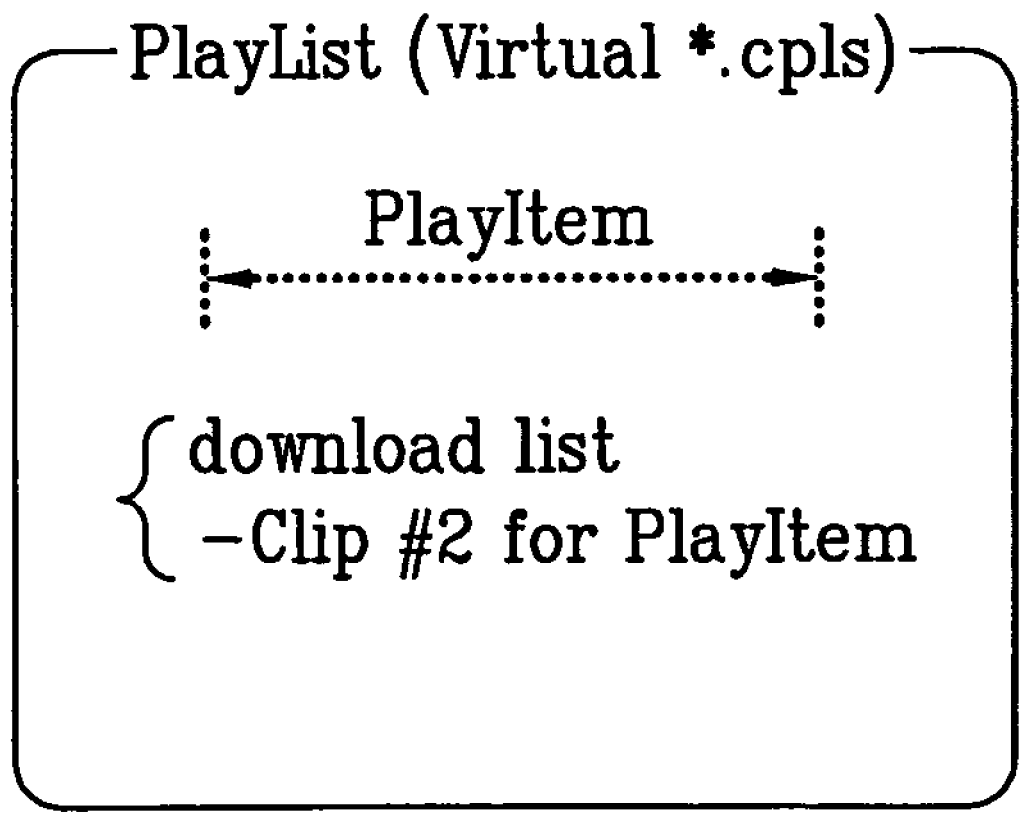
FIGS. 5A and 5B illustrate a method of creating a playback control file according to a first embodiment of the present invention.
Figure 5B:
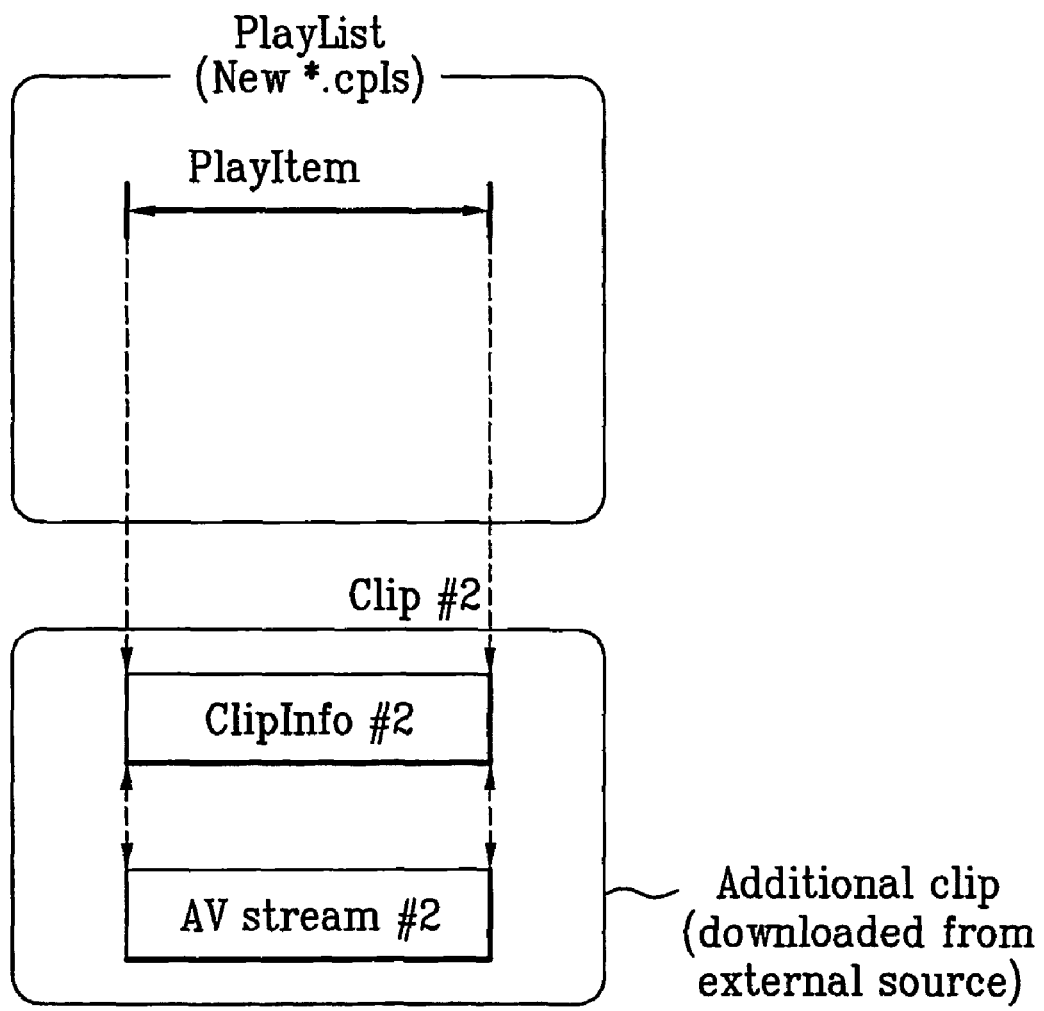

FIGS. 5A and 5B illustrate a method of creating a playback control file according to a first embodiment of the present invention. FIG. 5A illustrates a virtual PlayList (*.cpls) recorded within the optical disc. The virtual PlayList is similar to the virtual PlayList shown in FIG. 3B, except for that an additional clip (Clip #2) is designated by a download list. And, FIG. 5B illustrates a new PlayList (*.cpls) which is created based on the virtual PlayList shown in FIG. 5A. The additional clip (Clip #2) designated by the download list of the virtual PlayList is downloaded from the external source. Herein, the new PlayList represents a PlayList, which is newly created after the additional clip is downloaded. At this point, control information controlling reproduction of the additional data is also included in the new PlayList, which will be described in detail later on with reference to FIG. 9.

More specifically, the virtual PlayList (*.cpls) according to the first embodiment of the present invention cannot be reproduced by itself prior to downloading the additional clip (Clip #2). After downloading the additional clip (Clip #2), the virtual PlayList is connected to the PlayItem, from which the new PlayList (*.cpls) is created and used. However, as described above, the process of creating the new PlayList (*.cpls) may be omitted, and instead, the control information for reproducing the additional data may be provided in the virtual PlayList (*.cpls) in advance. This process will be described in more detail with reference to FIG. 9.

Figure 6A:
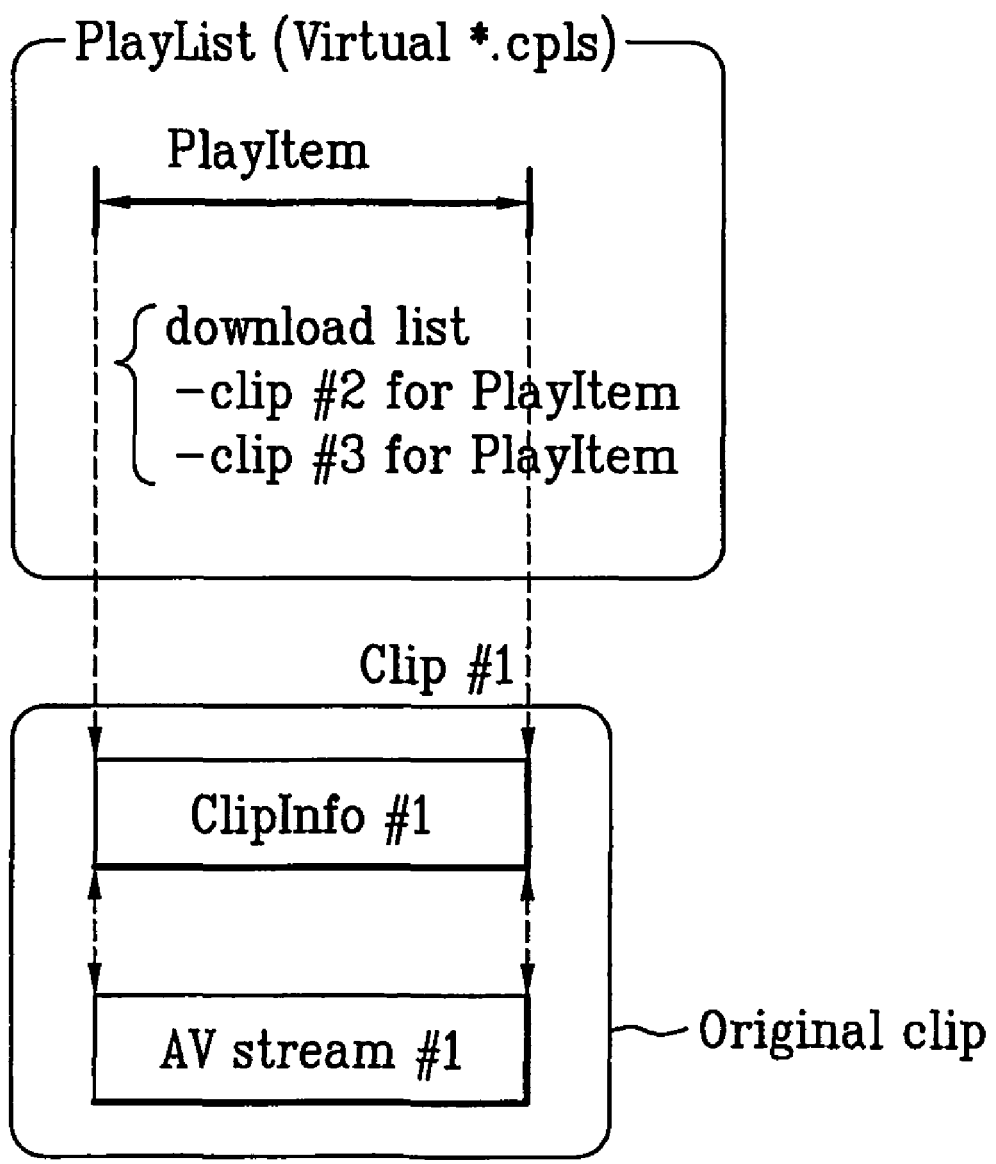
FIGS. 6A and 6B illustrate a method of creating a playback control file according to a second embodiment of the present invention.
Figure 6B:
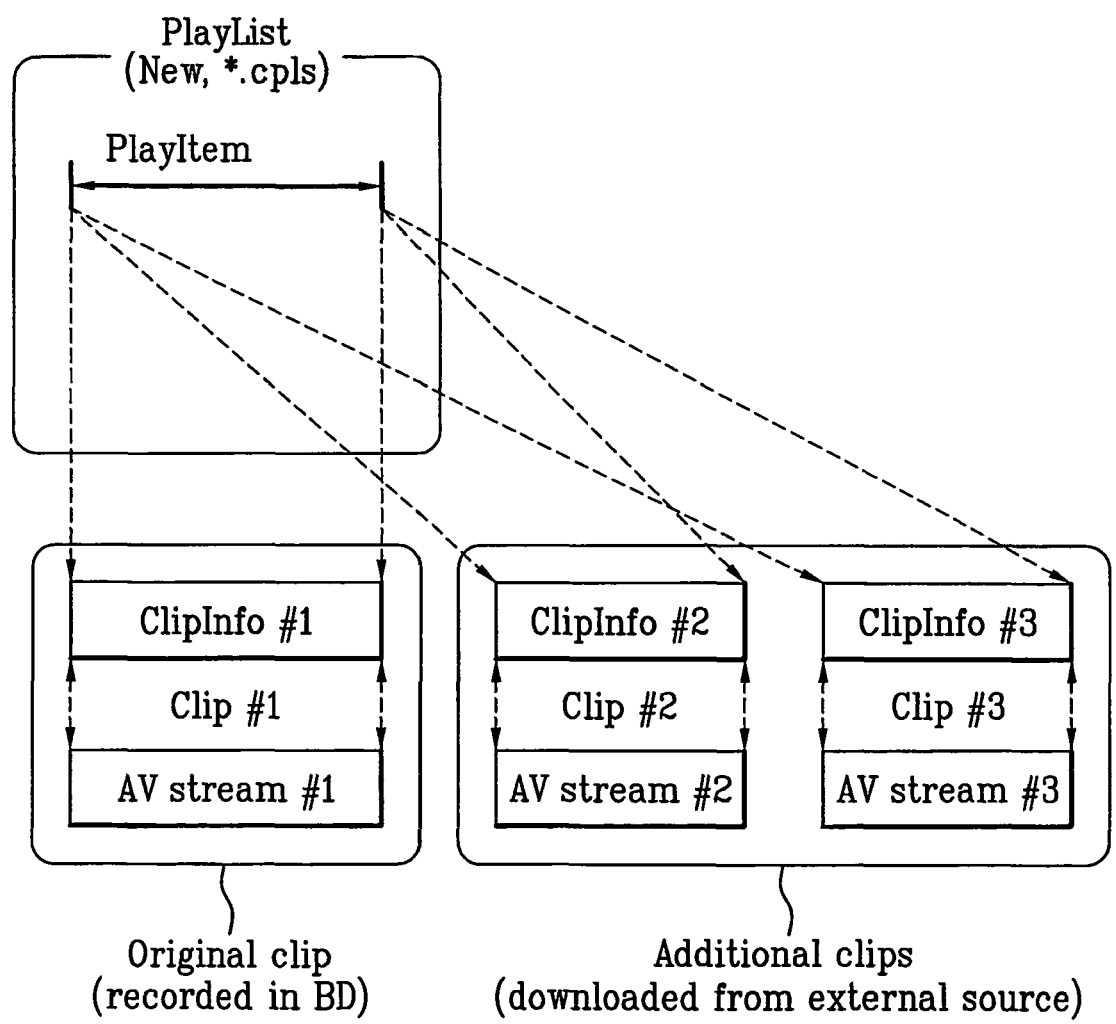

FIGS. 6A and 6B illustrate a method of creating a playback control file according to a second embodiment of the present invention. FIG. 6A illustrates a virtual PlayList (*.cpls) recorded within the optical disc. The virtual PlayList is similar to the virtual PlayList shown in FIG. 3C, except for that additional clips (Clip #2, Clip #3) are designated by a download list. More specifically, before downloading the additional data from the external source, the virtual PlayList (*.cpls) according to the second embodiment of the present invention may be used for reproducing the original clip (Clip #1) being designated by a PlayItem. Then, when the additional data corresponding to the original data is downloaded, the original data and the additional data may be reproduced in combination.

And, FIG. 6B illustrates a new PlayList (*.cpls) which is created based on the virtual PlayList shown in FIG. 6A. The additional clips (Clip #2, Clip #3) designated by the download list of the virtual PlayList, as shown in FIG. 6A, are downloaded from the external source. Herein, the new PlayList represents a PlayList which is newly created after the additional clips are downloaded. The additional clips (Clip #2, Clip #3) downloaded from the external source are both controlled by a PlayItem. And, in this case, either the control information for controlling the additional data is included in the PlayItem in advance, or the control information is created when creating the new PlayList in order to control the additional data. More specifically, the virtual PlayList (*.cpls) according to the second embodiment of the present invention may be used individually for reproducing the original data. However, after downloading the additional clips (Clip #2, Clip #3), the virtual PlayList is connected to the PlayItem, so as to create and use the new PlayList (*.cpls), the new PlayList being the playback control file.

Figure 7A:
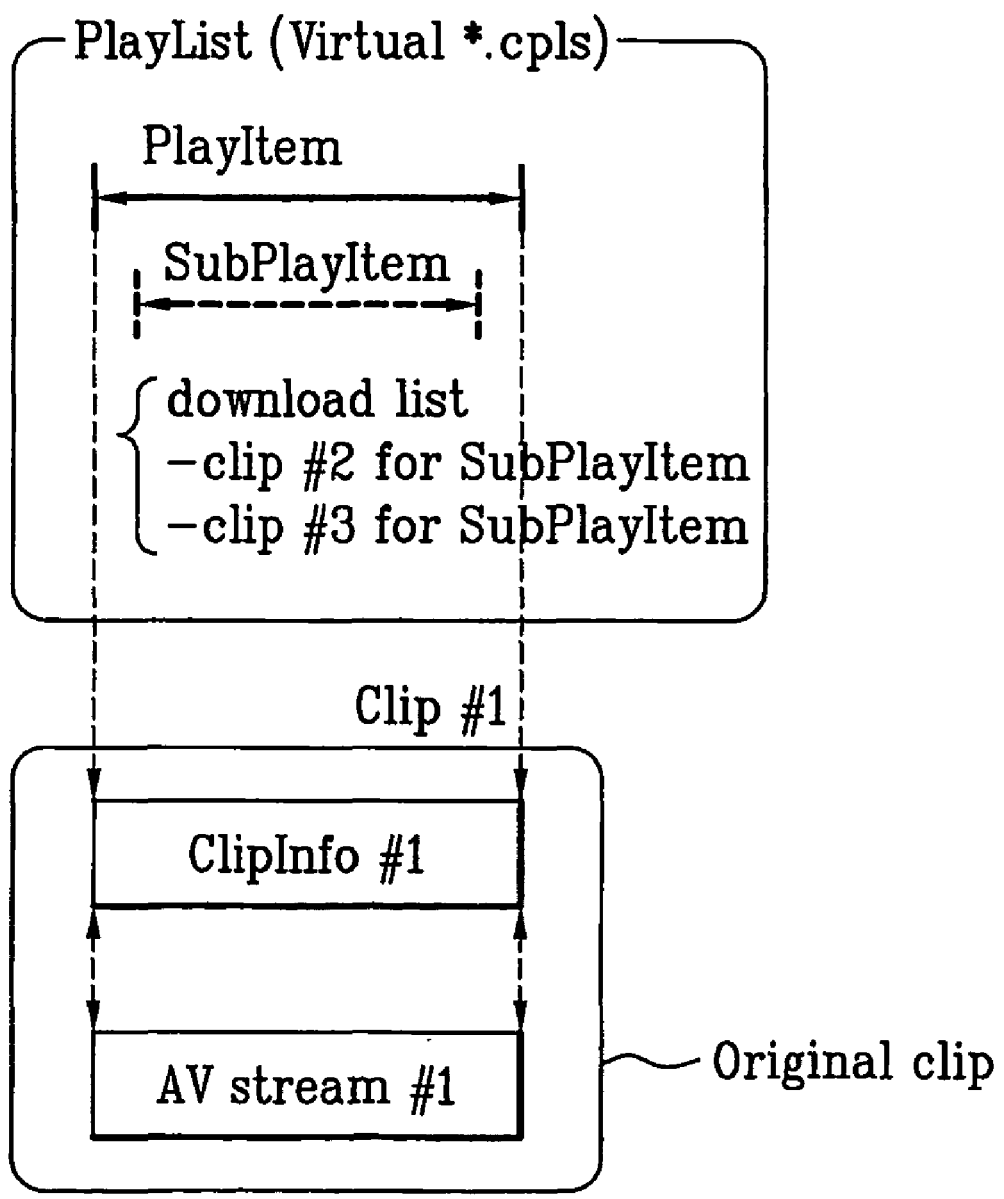
FIGS. 7A and 7B illustrate a method of creating a playback control file according to a third embodiment of the present invention.
Figure 7B:
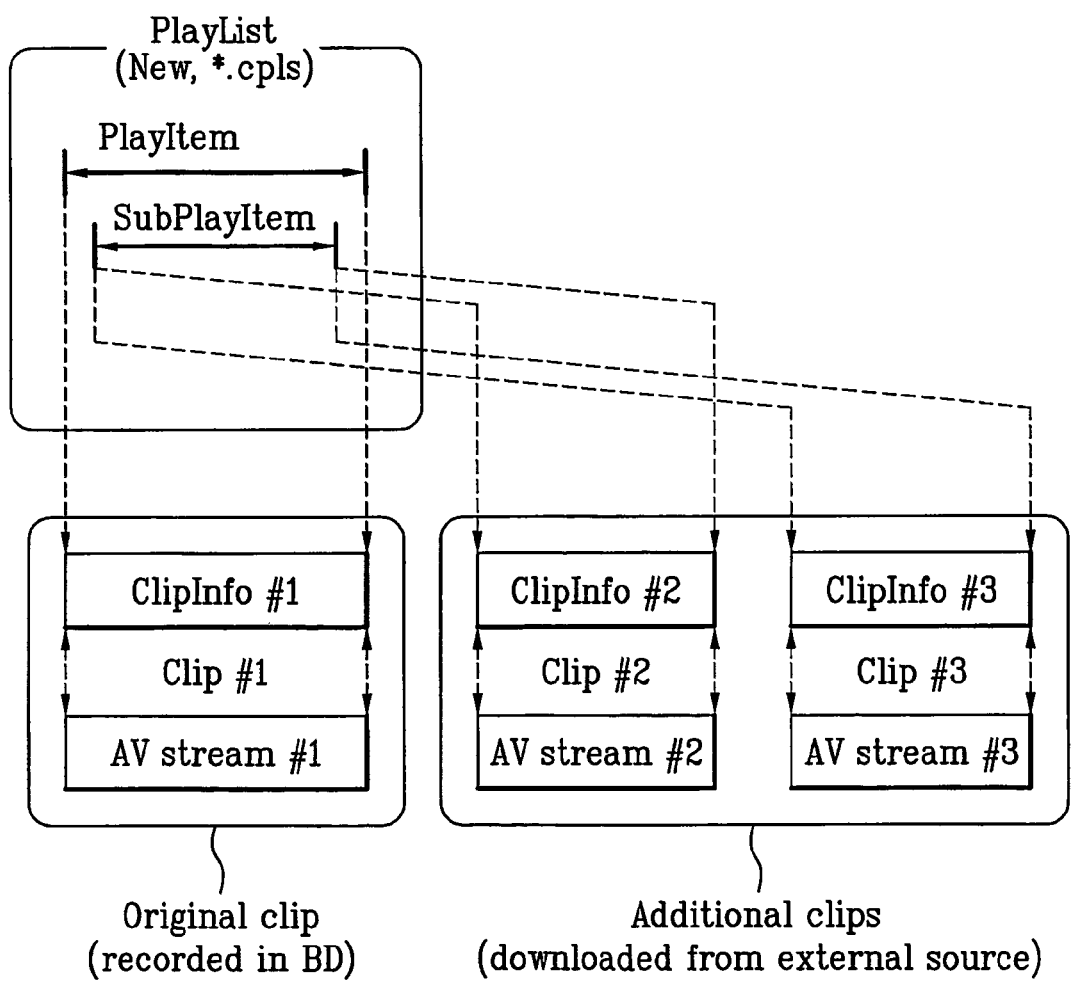

FIGS. 7A and 7B illustrate a method of creating a playback control file according to a third embodiment of the present invention. FIG. 7A illustrates a virtual PlayList (*.cpls) recorded within the optical disc. The virtual PlayList is similar to the virtual PlayList shown in FIG. 3D, except for that additional clips (Clip #2, Clip #3) are designated by a download list. More specifically, before downloading additional data from an external source, the virtual PlayList (*.cpls) according to the third embodiment of the present invention may be used for reproducing the original clip (Clip #1) which is designated by the PlayItem. Then, when the additional data associated with the original data is downloaded, the additional data can be reproduced by using a SubPlayItem.

And, FIG. 7B illustrates a new PlayList (*.cpls) which is created based on the virtual PlayList shown in FIG. 7A. The additional clips (Clip #2, Clip #3) designated by the download list of the virtual PlayList are downloaded from the external source. Herein, the new PlayList represents the PlayList which is newly created after the additional clips are downloaded. The additional clips (Clip #2, Clip #3) downloaded from the external source are both controlled by the SubPlayItem. And, in this case, one of the SubPlayItems is used to control reproduction of all of the additional data. More specifically, before downloading the additional clips (Clip #2, Clip #3) the virtual PlayList (*.cpls) according to the third embodiment of the present invention may be used for individually reproducing the original data by using the PlayItem. However, after downloading the additional clips (Clip #2, Clip #3), the virtual PlayList is connected to the SubPlayItem, so as to create and use the new PlayList (*.cpls) in the external source, the new PlayList being the playback control file.

Figure 8A:
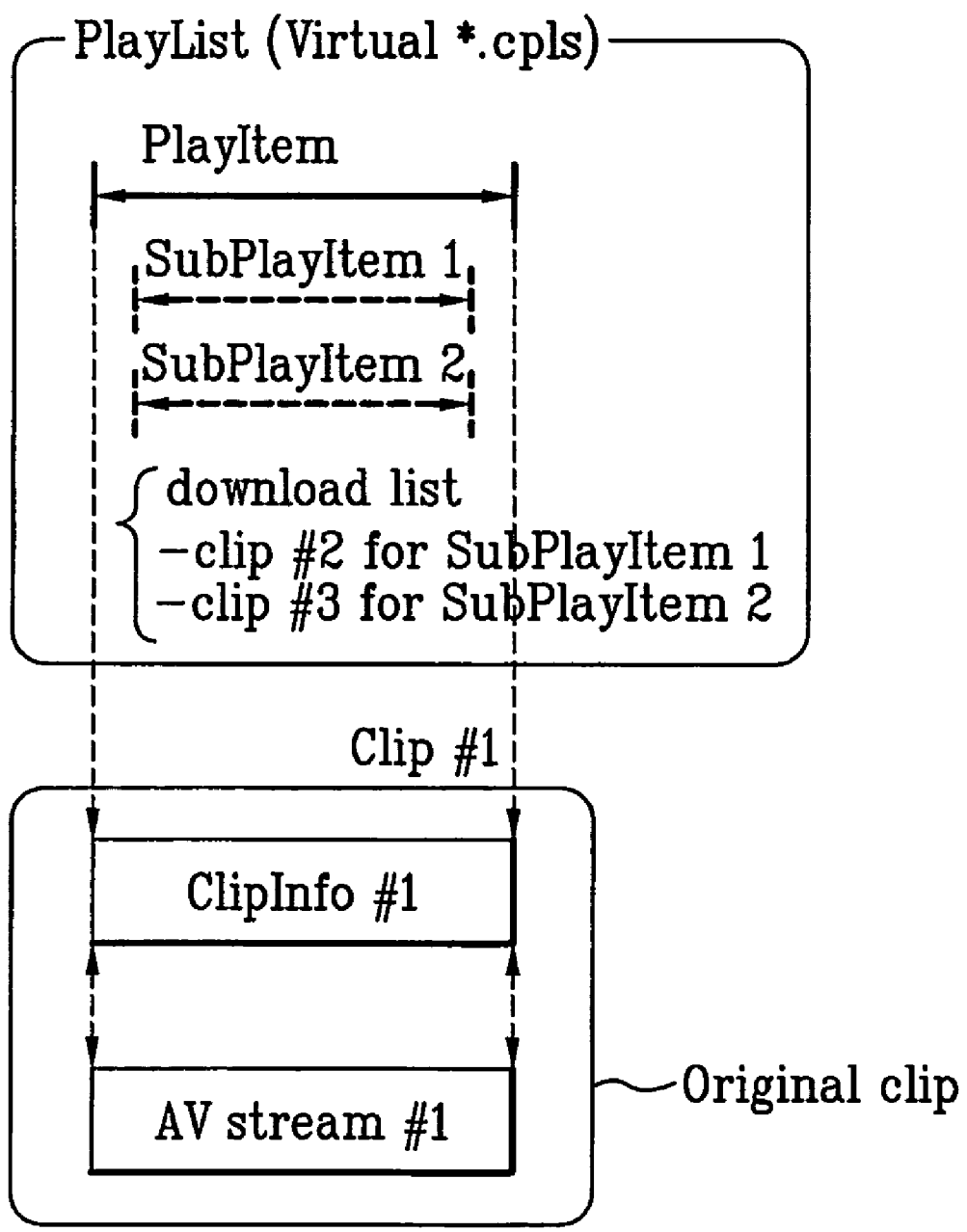
FIGS. 8A and 8B illustrate a method of creating a playback control file according to a fourth embodiment of the present invention
Figure 8B:
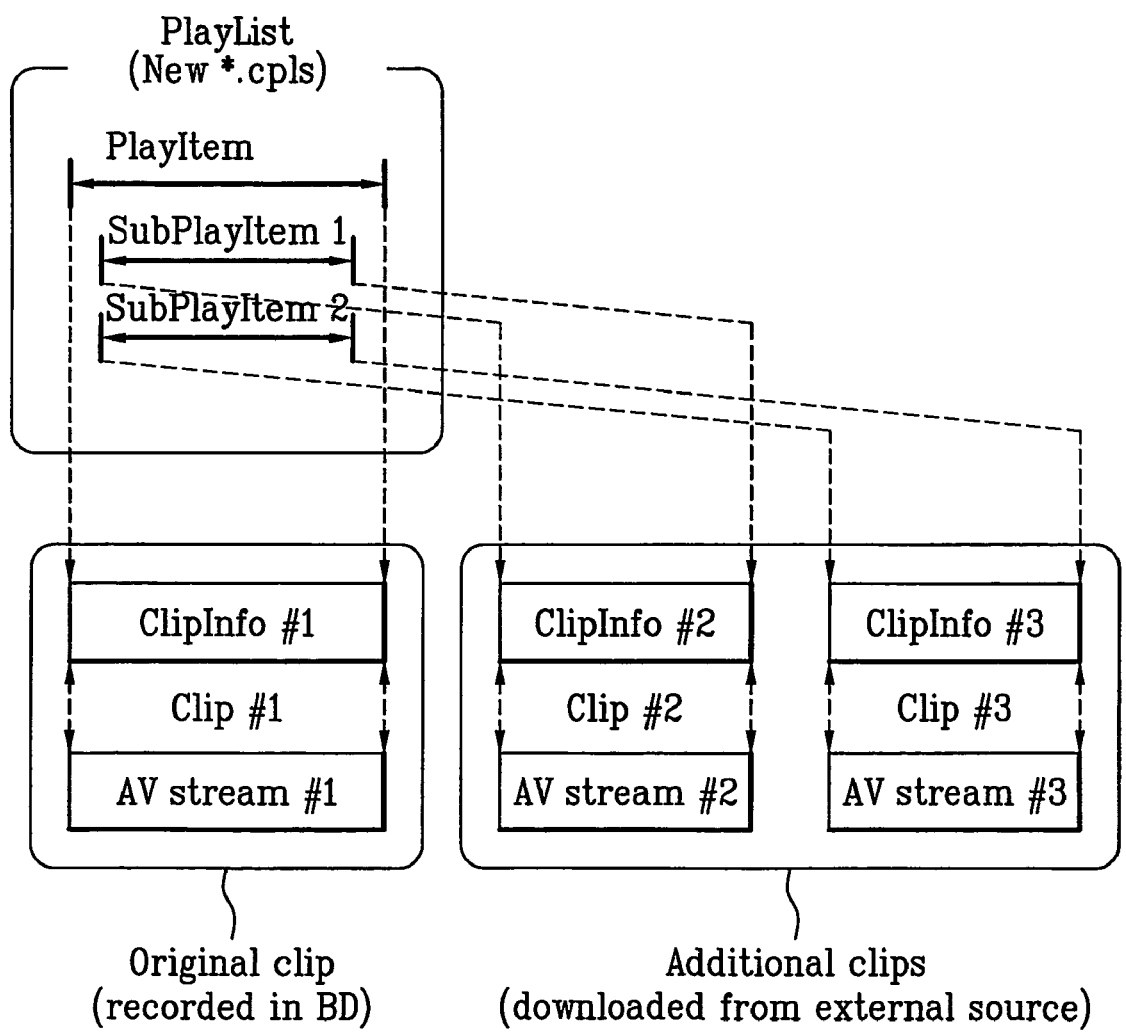

FIGS. 8A and 8B illustrate a method of creating a playback control file according to a fourth embodiment of the present invention. FIG. 8A illustrates a virtual PlayList (*.cpls) recorded within the optical disc. The virtual PlayList is similar to the virtual PlayList shown in FIG. 3D, except for that additional clips (Clip #2, Clip #3) are designated by a download list. More specifically, before downloading additional data from the external source, the virtual PlayList (*.cpls) according to the fourth embodiment of the present invention may be used for reproducing the original clip (Clip #1) which is designated by the PlayItem. Then, when the additional data associated with the original data is downloaded, the additional data can be reproduced by using a SubPlayItem. In this case, however, a SubPlayItem corresponding to each of the additional clips exists individually. For example, the additional clip #2 is the additional data which is controlled by SubPlayItem #1, and the additional clip #3 is the additional data which is controlled by SubPlayItem #2.

And, FIG. 8B illustrates a new PlayList (*.cpls) which is created based on the virtual PlayList shown in FIG. 8A. The additional clips (Clip #2, Clip #3) designated by the download list of the virtual PlayList are downloaded from the external source. Herein, the new PlayList represents a PlayList which is newly created after the additional clips are downloaded. Each of the additional clips (Clip #2, Clip #3) downloaded from the external source is individually controlled by SubPlayItem #1 and SubPlayItem #2, respectively. More specifically, before downloading the additional clips (Clip #2, Clip #3), the virtual PlayList (*.cpls) according to the fourth embodiment of the present invention may be used for individually reproducing the original data by using the PlayItem. However, after downloading the additional clips (Clip #2, Clip #3), the virtual PlayList is connected to each of the SubPlayItems (SubPlayItem #1, SubPlayItem #2), corresponding to each of the additional clips (Clip #2, Clip #3), respectively, so as to create and use the new PlayList (*.cpls) in the external source, the new PlayList being the playback control file.

Figure 9:
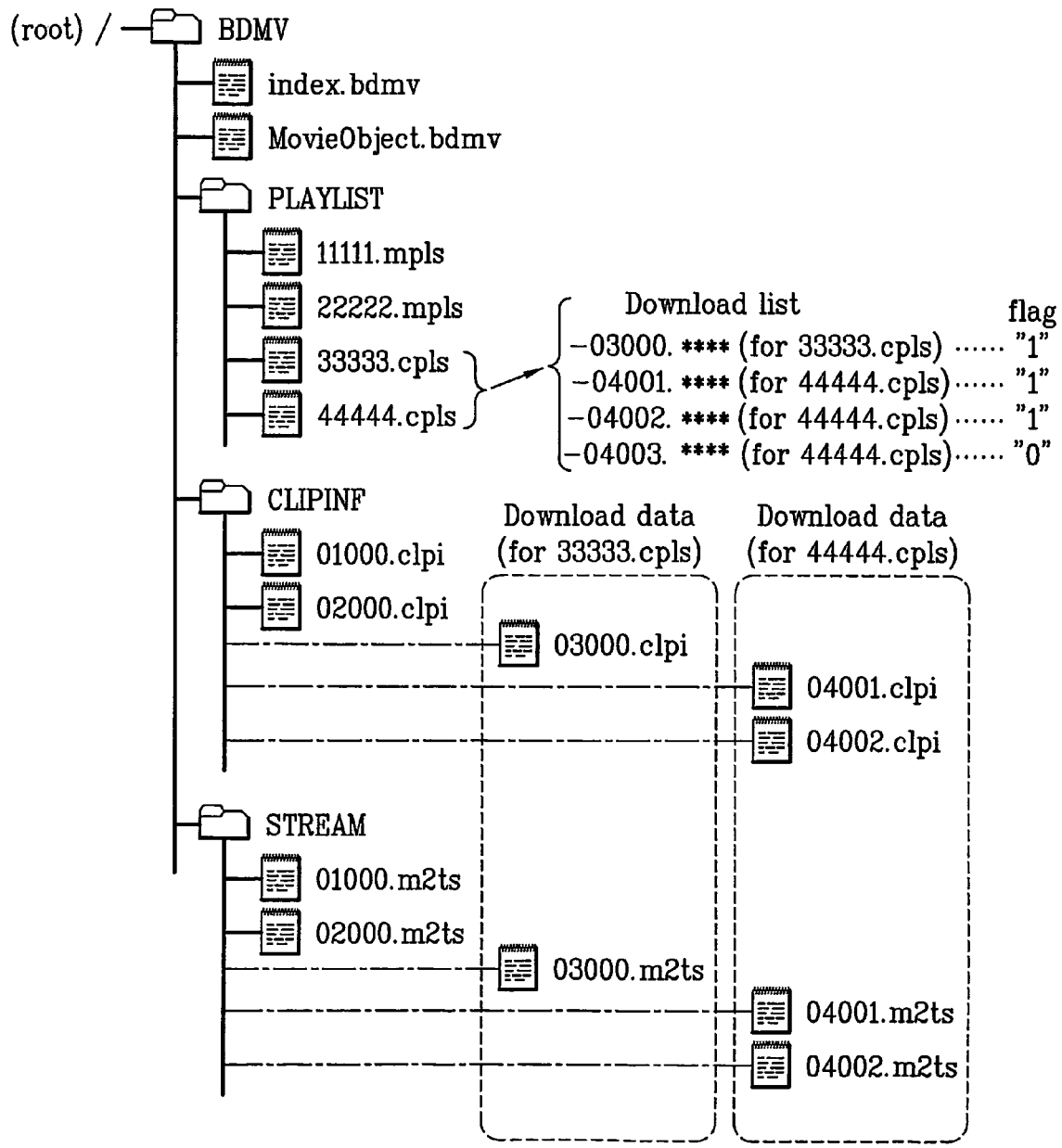
FIG. 9 illustrates a file structure showing the method of controlling the playback control file according to the present invention.

As described in the first to fourth embodiments of the present invention, the virtual PlayList according to the present invention may be formed by various methods. The virtual PlayList is used not only to reproduce the original data recorded on the optical disc, but also to reproduce the additional data existing in the external source. And, accordingly, the manufacturer of the optical disc predicts the future use of the virtual PlayList for the additional data and, thus, creates in advance a virtual PlayList suitable for reproducing the additional data within the optical disc. More specifically, when reproducing only the additional data, which is not associated with the original data, the virtual PlayList according to the first embodiment of the present invention (shown in FIG. 5A) will be used. And, when the original data and the corresponding additional data are reproduced in combination, any one of the virtual PlayLists according to the second to fourth embodiments of the present invention (shown in FIGS. 6A, 7A, and 8A, respectively) may be used. However, the selection of the virtual PlayList may vary depending upon the independence level of the additional clip. More specifically, for the most independent additional clip, the virtual PlayList according to the fourth embodiment (shown in FIG. 8A) can be used, and for the additional clip most associated with the original data, the virtual PlayList according to the second embodiment (shown in FIG. 6A) can be used FIG. 9 illustrates a file structure showing the method of controlling the playback control file according to the present invention and, more particularly, illustrates a method of controlling the virtual PlayList recorded within the optical disc. The detailed description of the file structure is identical to that of the file structure shown in FIG. 2 and will, therefore, be omitted for simplicity. The description of FIG. 9 will be mainly focused on the method of controlling the playback control file.

More specifically, when an optical disc having the file structure, as shown in FIG. 9, is loaded, the optical recording and/or reproducing apparatus 10 first verifies the virtual PlayList files (33333.cpls, 44444.cpls) recorded within the optical disc and also verifies the download list recorded therein. As described above, the download list may be included in each of the virtual PlayList files, or the download list may exist as independent download list file information. For example, in FIG. 9, file names of four additional data are recorded in the download list, wherein "03000.**" is the file name of the additional data that is to be downloaded for the virtual PlayList "33333.cpls", and wherein "04001.", "04002.", and "04003.**" are file names of the additional data that are to be downloaded for the virtual PlayList "44444.cpls".

Then, after verifying the download list, the optical recording and/or reproducing apparatus 10 downloads the corresponding additional data in accordance with a user command or a system command. FIG. 9 illustrates an example of the files "03000.**", "04001.", and "04002." being downloaded as the additional data, which are virtually linked to the corresponding file structure. Therefore, the optical recording and/or reproducing apparatus 10 should also control flags for identifying the additional data that are downloaded (or downloaded additional data) by using the download list and the additional data that are not downloaded (or non-downloaded additional data). For example, a flag named as "1" is assigned to each of the downloaded files "03000.", "04001.", and "04002.", and a flag named as "0" is assigned to the non-downloaded file "04003.**". More specifically, the downloaded additional data that is identified by the flag becomes the normal data that can be reproduced, and the non-downloaded additional data becomes data that requires downloading whenever the user requires data reproduction in a later process.

Therefore, the optical recording and/or reproducing apparatus 10 downloads corresponding additional data by using the virtual PlayList verified by the optical disc. Then, the optical recording and/or reproducing apparatus 10 is provided with control information including flags that mark data for which downloading is completed. Subsequently, a new PlayList is created, thereby allowing the additional data to be reproduced. The method of creating the new PlayList is described above with reference to FIGS. 5A to 8B.

Figures 10A, 10B:
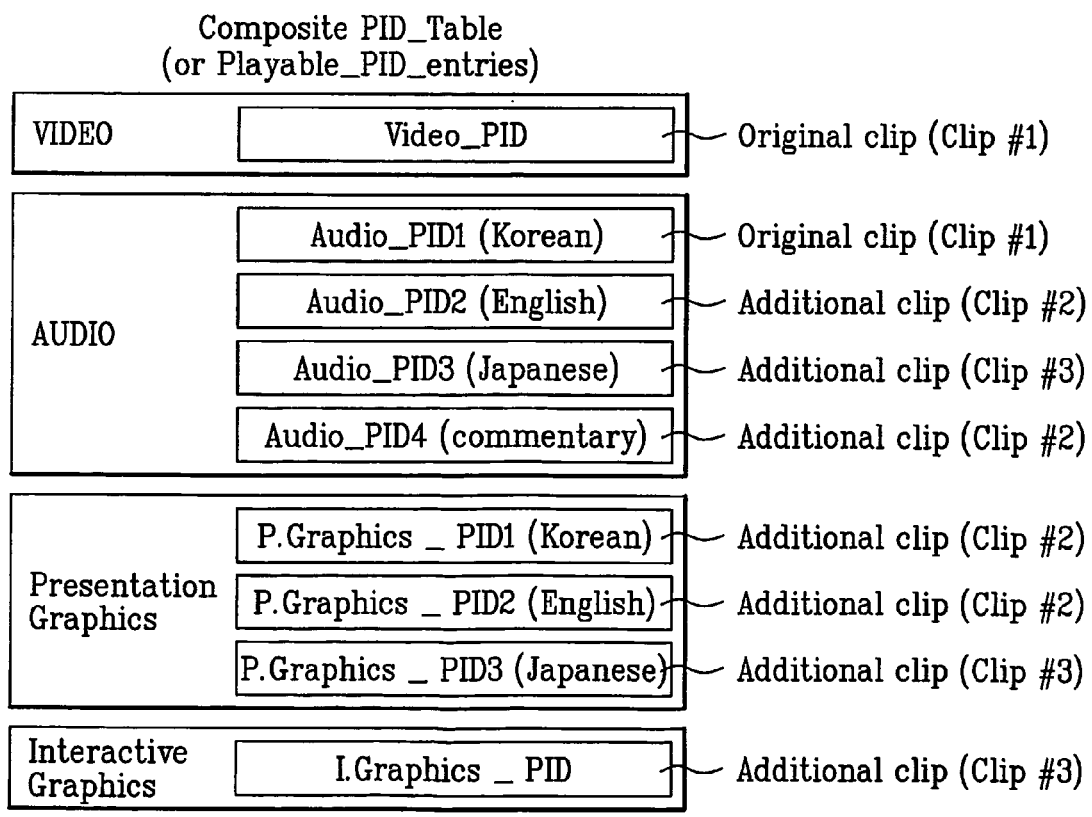
FIGS. 10A to 10C illustrate control information for controlling the playback control file according to the present invention.
Figure 10C:
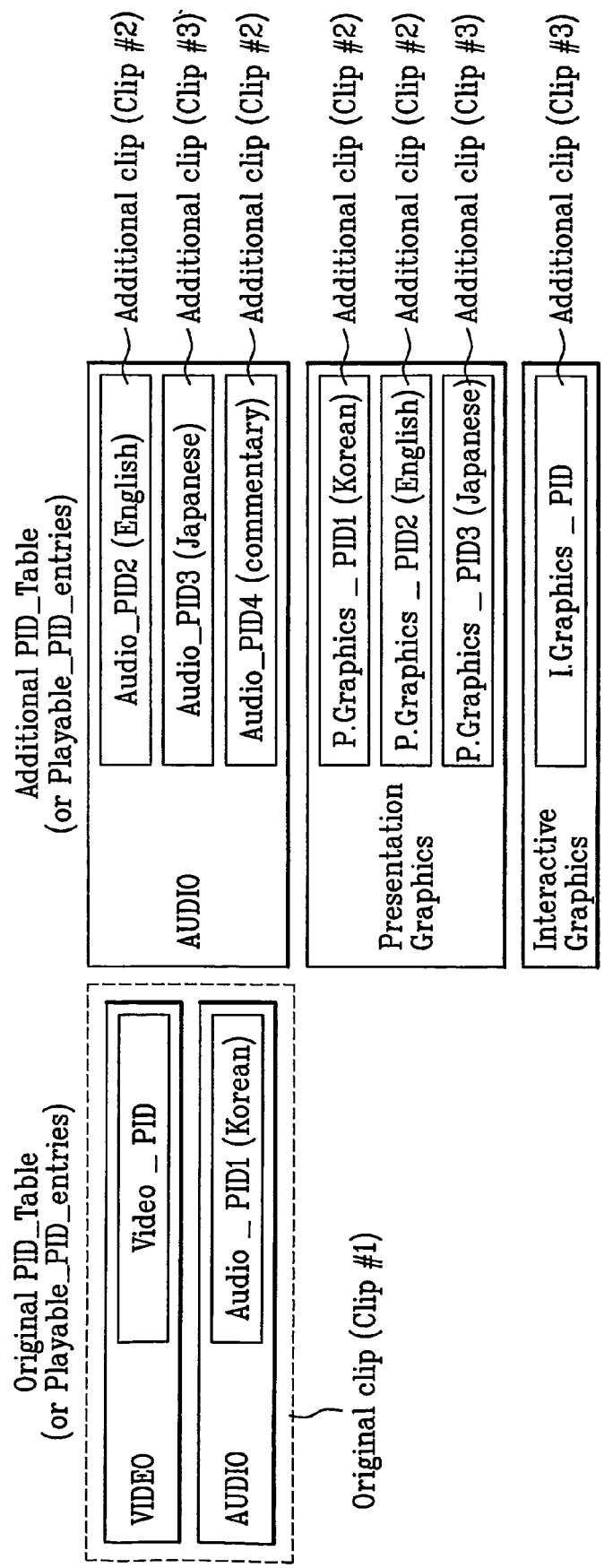

FIGS. 10A to 10C illustrate control information for controlling the playback control file according to the present invention. More specifically, control information allowing the original data and the additional data to be selected is recorded in a specific location within the new PlayList (or the virtual PlayList). Herein, the control information consists of a packet identification (PID) table.

Generally, PID is information being recorded on an MPEG-2 transport stream, wherein an identical D is given to an identical packet so as to allow an AV decoder (numeral 17 of FIG. 11) to selectively decode a packet having an identical PID value. Therefore, the PID_Table is a type of control information for controlling the PID information in the form of a table. And, when a user desires to reproduce some specific data, the PID_Table may be used as reference information.

FIG. 10A illustrates an example of a syntax of the PID_Table, which is recorded on a specific location within the new PlayList (or virtual PlayList). Herein, the PID_Table is formed of PID_entries, and each of the PID_entries includes a corresponding ref_to_stream_PID(k), and a sub_PlayItem_num, when attributes and a SubPlayItem also exist. The PID_Table having the above-described configuration can be recorded within a new PlayList, or within a virtual PlayList. More specifically, when recording the PID_Table within the new PlayList, the additional data is downloaded and the PID- _Table is formed in accordance with the received additional data Alternatively, when recording the PID_Table within the virtual PlayList, the disc manufacturer predicts the additional data to be downloaded and forms the PID_Table accordingly. Also, the PID_Table can form a Composite PID_Table wherein the original data and the additional data are bound together, or the PID_Table can separate the PID_Table for the original data from the PID_Table for the additional data, which will be described in more detail in FIGS. 10B and 10C.

FIG. 10B illustrates an example of a Composite PID_Table, wherein the original data and the additional data are bound together, which is suitable for being used when reproducing the original data and the additional data in combination, as shown in FIGS. 6B, 7B, and 8B. More specifically, the Composite PID_Table is a method for forming and controlling all the PID information included in the original clip (Clip #1) and two additional clips (Clip #2, Clip #3) by using a single table. Accordingly, the user is able to select a reproduction method that he or she desires (e.g., selecting a video in the original sound (or English)). And, depending upon the user selection, the optical recording and/or reproducing apparatus 10 refers to the newly formed Composite PID_Table, so as to reproduce the video from the video stream of the original clip (Clip #1) and to reproduce the original sound (or English) from the audio stream (in English) of the additional clip (Clip #2), thereby meeting with the user's demands.

FIG. 10C illustrates an example of forming a PID_Table for each of the original data and the additional data, which are separated from each other. The example shown in FIG. 10C includes one original clip (Clip #1) and two additional clips (Clip #2, Clip #3), each of which is separated in order to form and control an Original PID_Table and an Additional PID_Table. More specifically, since the Original PID_Table is used for reproducing the original data recorded within the optical disc, an Original PID_Table already exists within the virtual PlayList, as described in FIGS. 6A, 7A, and 8A, and a duplicate Original PID_Table is not re-formed. Instead, only an Additional PID_Table for PD information for the additional data is formed. Furthermore, when controlling the additional data without any original data, as shown in FIG. 5A, only the Additional PID_Table is formed.

Apart from the method for controlling the virtual PlayList by using one of the Composite PID_Table and the Additional PID_Table, a method of defining attributes for each additional clip and, then, automatically reproducing the additional clip when the user selects the corresponding attribute is also proposed. For example, the original clip (i.e., the video stream and the audio stream (both in Korean)) is automatically reproduced when there is no user-selected attribute. Then, since the attributes for each additional clip are defined, when the user selects an audio stream (in English) included in the additional clip, additional clip #2 corresponding to the audio stream (in English) is automatically reproduced.

Figure 11:
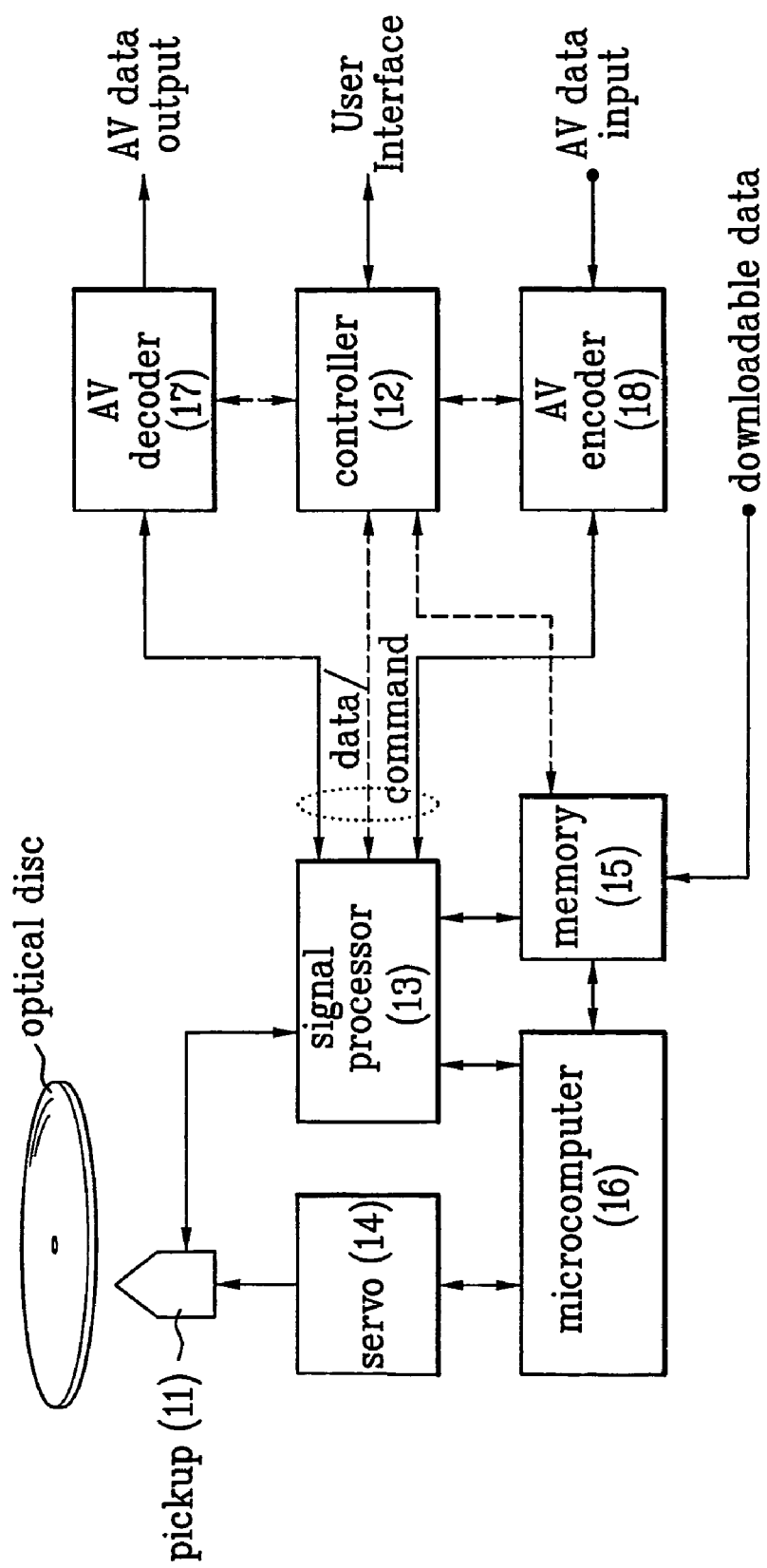
FIG. 11 illustrates an optical recording and/or reproducing apparatus according to the present invention.

FIG. 11 illustrates an optical recording and/or reproducing apparatus according to the present invention and, more particularly, illustrates a detailed structure of the optical recording and/or reproducing apparatus 10 creating a virtual PlayList and creating and controlling a new PlayList when required. The optical recording and/or reproducing apparatus 10 basically includes a pick-up unit 11 for reproducing the control information including the original data and the virtual PlayList recorded on the optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, and a microcomputer 16 controlling the above operations.

By using the download list, a controller 12 downloads additional data (clips) from an external source, and stores the downloaded additional data in a memory 15. In addition, additional file system information corresponding to the additional data is also downloaded from the external source is stored in the memory 15. Examples of the additional file system information are a file name, a file type, and attributes of each additional data file downloaded from the external source. The controller 12 then updates the original file system information which controls all the data files recorded on the disc by binding it with the additional file system information. The updated file system information is now able to control all the data files recorded in the disc as well as the additional data downloaded from the external source.

After all the additional data are stored in the memory 15, the controller 12 creates a new PlayList by modifying the virtual PlayList in accordance with the downloaded additional data, and stores the new PlayList in the memory 15. Herein, any one of the above-described first to fourth embodiments can be applied to the method of creating the new PlayList. Alternatively, a variation of any of the above-described embodiments may be used to create the new PlayList. In addition, the new PlayList should include flags for identifying completion of downloading, as described above, and the PID_Table as the control information, so as to allow the additional data to be efficiently reproduced.

Furthermore, the initial virtual PlayList may be used without having to separately create a new PlayList. In this case, when creating the virtual PlayList and recording the virtual PlayList within the optical disc, the additional data is predicted and the corresponding control information is recorded within the optical disc in advance. More specifically, the controller 12 downloads the additional data from the external source by using the download disc and stores the downloaded additional data in the memory 15. Then, the downloaded additional data is used in combination with the virtual PlayList recorded within the optical disc, which controls the downloaded additional data. In this case, it is preferable to create flags for identifying completion of downloading, which are stored and controlled in the memory 15.

In the above-described structure, the memory 15 storing the new PlayList and the additional data may either use a separate storing means (e.g. a local storage) for further storing purposes, or use a dynamic memory for temporarily storing data. In case the memory uses the separate local storage for further storing purposes, it is preferable that the new PlayList stored in the local storage is given priority in usage over the usage of the virtual PlayList and/or the normal PlayList being recorded within the optical disc.

When the additional data is downloaded and stored in local storage, being the storage means, and when the optical disc having the corresponding virtual PlayList is loaded, the additional data initially stored within the local storage can be used. And, the initial additional data can be used without having to download a separate set of additional data. Furthermore, an AV decoder 17 performs final decoding of output data (i.e., the original data and/or the additional data) depending upon the controls of the controller 12. And, in order to perform the function of recording a signal on the optical disc, an AV encoder 18 converts an input signal into a signal of a specific format (e.g. an MPEG-2 transport stream) depending upon the controls of the controller 12 and, then, provides the converted signal to the signal processor 13.

Figure 12:
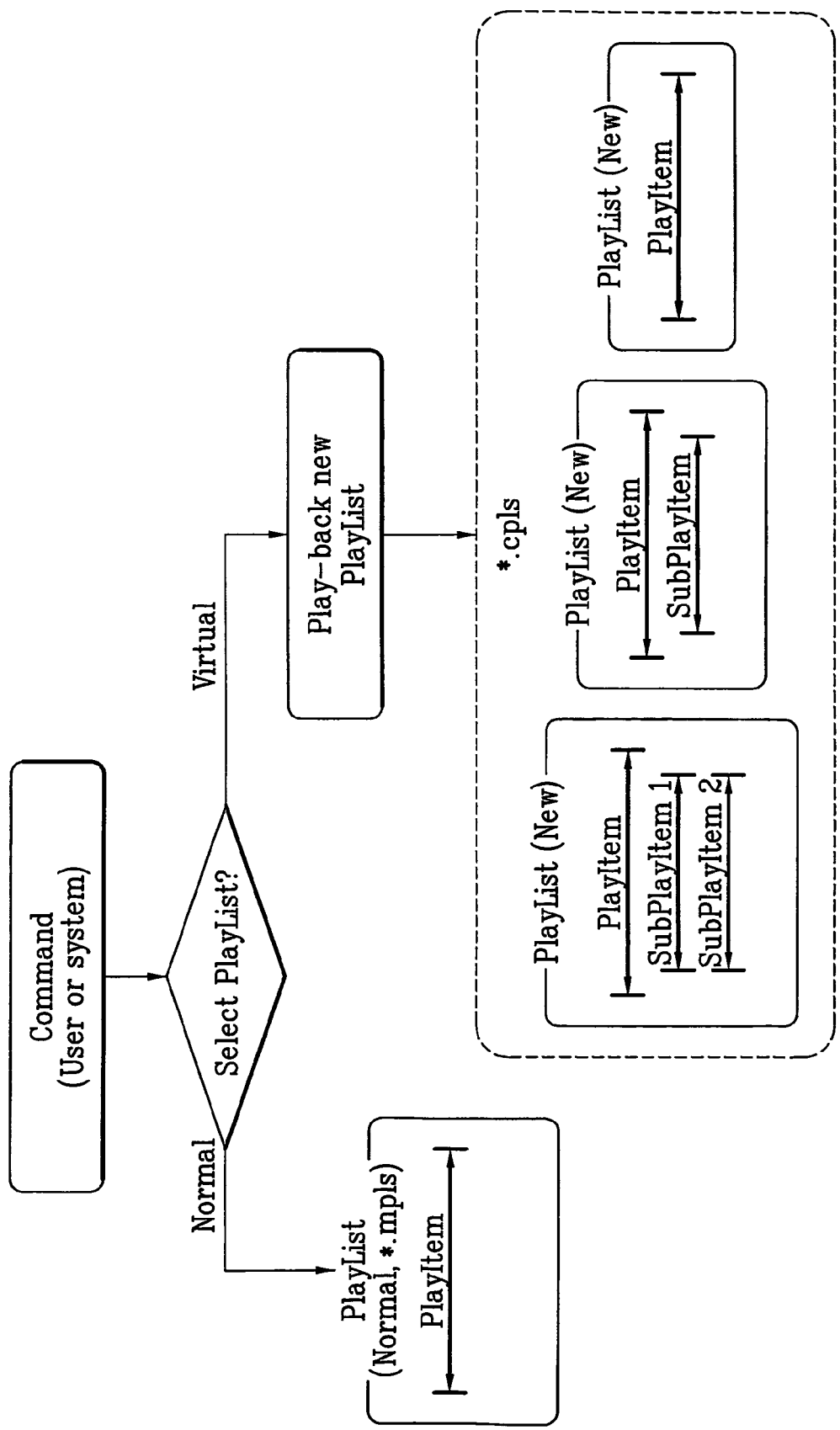
FIG. 12 illustrates a method for reproducing data recorded on the recording medium and data an external source existing outside of the recording medium according to the present invention.

FIG. 12 illustrates a method for reproducing data recorded on the recording medium and data an external source existing outside of the recording medium according to the present invention and, more particularly, illustrates a method of playing-back a PlayList selected by a user command or a system command, when a normal PlayList and a virtual PlayList are provided in an optical disc. More specifically, when the normal PlayList is selected, only the original data recorded on the optical disc is reproduced. On the other hand, when the virtual PlayList is selected, the additional data is downloaded from an external source by using a download list either included in the virtual PlayList or existing as a separate set of information, and the downloaded additional data is stored in the memory 15. Subsequently, depending upon the downloaded additional data, control information is bound to the virtual PlayList so as to create a new PlayList. FIG. 12 relates to a method of playing-back the new PlayList.

However, in case the new PlayList is not created as described above, only the additional data is downloaded, and the virtual PlayList recorded on the optical disc can be used directly. In this case, control information controlling the additional data should be provided in advance to the virtual PlayList, which is recorded on the optical disc. Furthermore, when the additional data has already been downloaded for a prior usage and downloaded in the memory 15, then the initially downloaded additional data may be used without having to download a duplicate version of the additional data It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides original data being recorded on the recording medium and additional data being downloaded from an external source can be more effectively used, thereby enhancing product efficiency and facilitating the user's use of the product.

The invention claimed is:

1. A method of creating a playback control file for an optical disc, the method comprising:
   reading a first PlayList identifying a download list from the optical disc, the download list designating at least one additional clip downloadable from an external source;
   downloading the at least one additional clip from the external source;
   storing the at least one additional clip in a local storage that is separate from the optical disc; and
   creating a second PlayList based on the first PlayList, the second PlayList including a PlayItem designating the at least one additional clip designated by the download list and stored in the local storage.

2. The method of claim 1, wherein the first PlayList further includes an original PlayItem designating at least one original clip recorded on the optical disc.

3. The method of claim 2, wherein the PlayItem further designates the at least one original clip designated by the original PlayItem.

4. The method of claim 2, wherein the first PlayList further includes control information enabling a specific clip from the at least one additional clip to be selected.

5. The method of claim 4, wherein control information includes a packet identification (PID) table identifying the at least one additional clip.

6. The method of claim 4, wherein the control information includes a packet identification (PID) table identifying the at least one original clip and the at least one additional clip.

7. The method of claim 4, wherein the control information includes a first packet identification (PID) table identifying the at least one original clip, and a second packet identification (PID) table identifying the at least one additional clip.

8. The method of claim 4, wherein the control information includes attribute information for each of the at least one additional clip.

9. The method of claim 1, wherein the second PlayList further includes control information enabling a specific clip from the at least one additional clip to be selected.

10. The method of claim 9, wherein the control information includes an indicator indicating whether each of the at least one additional clip has been downloaded from the external source.

11. The method of claim 1, wherein the second PlayList further includes a SubPlayItem designating the at least one additional clip designated by the download list.

12. The method of claim 11, wherein the second PlayList includes a plurality of SubPlayItems, each SubPlayItem designating at least one of the plurality of additional clips.

13. A method of reproducing data recorded on an optical disc, the method comprising:
   reading a first PlayList identifying a download list from the optical disc, the download list designating at least one additional clip downloadable from an external source;
   downloading the at least one additional clip from the external source;
   storing the at least one additional clip in a local storage that is separate from the optical disc;
   creating a second PlayList based on the first PlayList, the second PlayList including a PlayItem designating the at least one additional clip designated by the download list and stored in the local storage; and
   reproducing the additional clip based on the second PlayList.

14. An apparatus for reproducing data recorded on an optical disc, the apparatus comprising:
   a pickup unit configured to read data recorded on the optical disc;
   a local storage configured to store at least one additional clip downloaded from an external source; and
   a controller configured to control the pickup unit to read a first PlayList identifying a download list from the optical disc, the download list designating the at least one additional clip, wherein the controller creates a second PlayList based on the first PlayList, the PlayList including a PlayItem designating at least one additional clip designated by the download list and stored in the local storage.

15. The apparatus of claim 14, wherein the second PlayList further includes a SubPlayItem designating the at least one additional clip designated by the download list.

16. The apparatus of claim 15, wherein the second PlayList includes a plurality of SubPlayItems, each SubPlayItem designating at least one of the plurality of additional clips.

* * * * *